Figure 1:
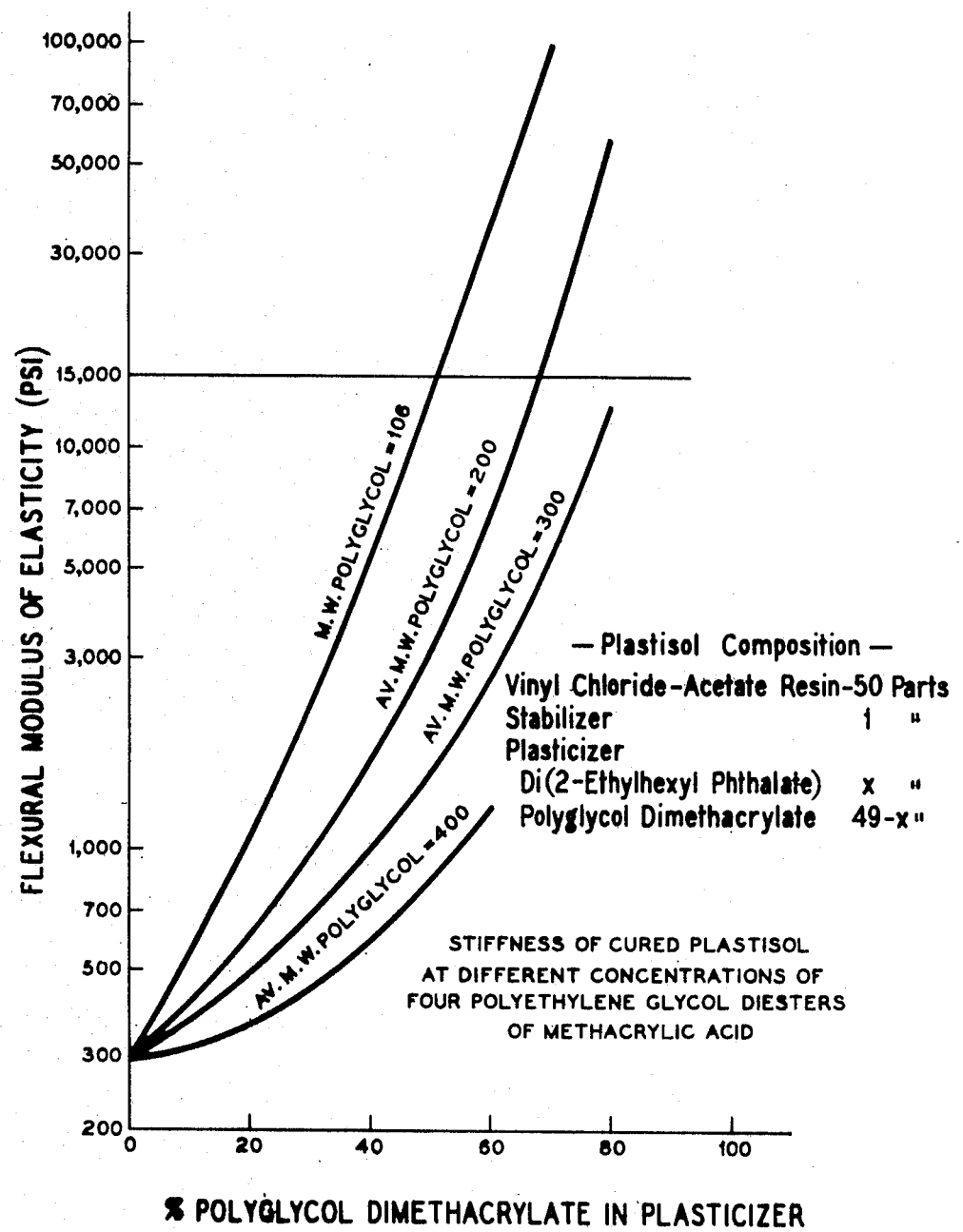

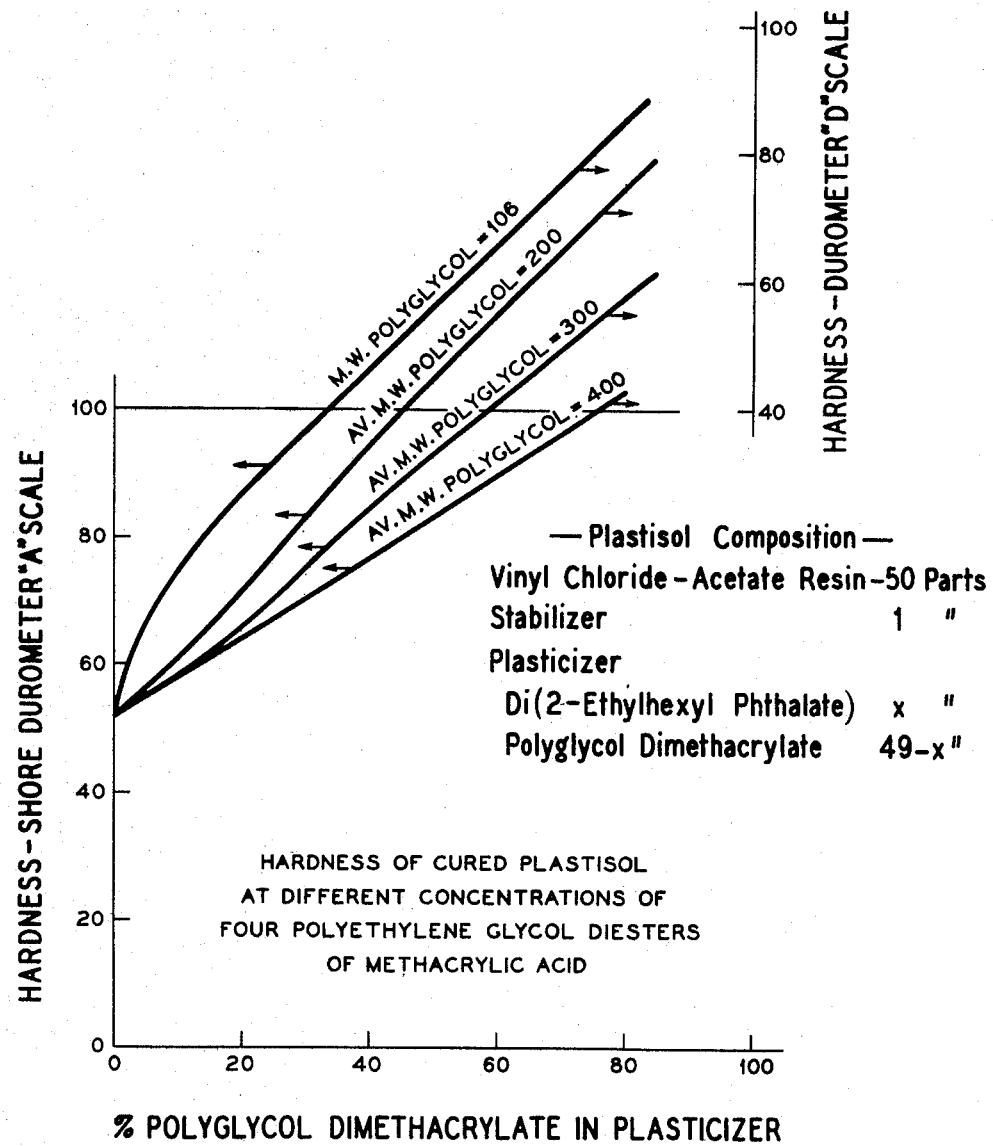

Patented Nov. 18, 1952

2,618,621

UNITED STATES PATENT OFFICE 2,618,621

DISPERSIONS OF VINYL CHLORIDE RESINS IN PLASTICIZERS CONTAINING POLYGLYCOL METHACRYLATES

Samuel L. Burt, Pinson, Ala., assignor, by mesne assignments, to Union Carbide and Carbon Corporation, a corporation of New York Application September 27, 1949, Serial No. 118,174

6 Claims. (Cl. 260—31.4)

Dispersions of finely-divided vinyl chloride resins suspended in liquid plasticizers have been recently introduced under the term plastisols. These dispersions are fluid at ordinary temperatures, but on heating and subsequent cooling, they are converted to solid, elastomeric compositions due to solvation of the dispersed resin particles by the plasticizer. Heretofore, only very flexible elastomers have been made from plastisols because the amount of plasticizer required to yield a fluid dispersion or paste with the finely-divided vinyl chloride resin is so high that when the resin is ultimately elasticized with the plasticizer, the resulting elastomer is quite flexible and soft.

Accordingly, the object of this invention is to prepare modified plastisols which are fluid at ordinary temperatures but which will set up after a heating and cooling cycle to semi-rigid to moderately flexible elastomers. This is accomplished by replacing part of the usual plasticizer employed in plastisols with a methacrylate diester of a liquid polyethylene glycol. In the liquid state, this ester serves as part of the dispersant for the suspended particles of the vinyl chloride resin, but on heating it polymerizes. On cooling the gelled mass, the polymeric ester forms part of the colloidal composition but it is less effective as a plasticizer than the usual non-polymeric ester plasticizers. Consequently, the elastomer is stiffer.

It is known that plastic compositions may be formed by mixing a high molecular weight polymer with a vulcanizable plasticizer which is capable of polymerizing on heating and then heating the mixture to form a mass of reduced thermoplasticity. This invention differs from this previous practice in that the requirements for a polymerizable plasticizer in a plastisol are diverse and exacting and the usual polymerizable esters are excluded thereby. These requirements are:

1. The polymerizable plasticizer must be compatible with vinyl chloride resins and their conventional ester plasticizers both as a monomer and as a polymer.

2. It must not solvate the vinyl chloride resin at ordinary temperatures; otherwise the plastisols tend to gel and be too viscous. This requirement excludes such closely related materials as diethylene glycol diacrylate.

3. It must be capable of curing rapidly in the presence of the usual peroxide catalysts at temperatures of 150° C., but must not spontaneously polymerize at ordinary temperature as otherwise the plastisol will gel. This requirement excludes all the common polymerizable polyfunctional esters, such as diallyl maleate, diallyl succinate, and diallyl phthalate.

The amounts of vinyl chloride resins, non-polymerizable ester plasticizers, and methacrylate diester of a polyethylene glycol which give plastisols of the desired viscosity which set up to elastomers of the desired rigidity is subject to definite limitations. In order that the plastisols will be fluid for application purposes, it is necessary that the sum of the two types of plasticizers constitute 40 to 60% by weight of the total of resin and both types of plasticizer, the vinyl chloride resin concentration being correspondingly 40 to 60% of the total. Of the two types of plasticizers, the polyglycol methacrylate diester may constitute 10 to 80% of the total plasticizer for the extreme range of the methacrylate diesters of the liquid polyethylene glycols. However, it is desirable that the cured elastomer have a stiffness (flexural modulus of elasticity) below 15,000 p. s. i. and a hardness below 100 on the Shore durometer "A" scale=40 on the Shore durometer "D" scale. Both the stiffness and the hardness of the cured elastomer decrease with increasing molecular weight of the liquid polyethylene glycol which is esterified with methacrylic acid. Also, the stiffness and hardness increase with increasing concentration of the polyglycol dimethacrylate in the plasticizer. These relationships are shown in Figures 1 and 2 of the drawing. Therefore, it is preferable that the concentration of the polyglycol dimethacrylate in the plastizer be selected so that the cured elastomer will have both a hardness below 100 on the Shore durometer "A" scale, and a flexural modulus of elasticity below 15,000 p. s. i. The preferred concentrations for several polyethylene glycol dimethacrylate esters will be given below:

| Mol. Wt. of Polyethylene Glycol Esterified | Percent in Plasticizer |
| --- | --- |
| 106 (diethylene glycol) | 10–40 |
| 200 (Av.) | 20–40 |
| 300 (Av.) | 20–60 |
| 400 (Av.) | 20–80 |

The polyethylene glycols are liquids up to average molecular weights of about 600 and the methacrylate esters of all these glycols may be used in the practice of this invention. However, as shown in Figures 1 and 2 of the drawing, diethylene glycol dimethacrylate is the most effective in increasing the hardness and stiffness of the elastomer for the minimum amount of modifier and this ester is preferred. The esters may be made by any conventional esterification procedure.

The plastisols containing the polyglycol dimethacrylates as part of the plasticizer may be made by the same methods now practiced, i. e. by stirring specially prepared vinyl chloride resins in the plasticizer mixture or by grinding the resins and the plasticizer in a three-roll mill.

In order to facilitate curing of the polyglycol dimethacrylate, it is preferable to incorporate from 0.5 to 5% by weight of the ester of a peroxide polymerization catalyst such as benzoyl peroxide, acetyl peroxide, t-butyl perbenzoate, lauroyl peroxide, and the like. In order to inhibit premature polymerization of the polyglycol ester in the plastisol, a polymerization inhibitor, such as hydroquinone, may be added. The temperature and time of curing the modified plastisol are not critical, and experiments indicate that the cured plastisol has reached its maximum stiffness after heating for 2 to 3 minutes at 160° C. Longer periods of heating are not harmful and may be required in some applications where thick sections are to be cured to insure complete gelatinization of the vinyl chloride resins by the plasticizer. The usual heat stabilizers for vinyl chloride resins are also included.

The vinyl chloride resins employed in the making of the suspensions may be copolymers of vinyl chloride with other polymerizable materials, such as vinyl acetate, vinyl propionate, methyl acrylate, butyl acrylate, methyl methacrylate, butyl methacrylate, acrylonitrile, vinylidine chloride and maleate esters, such as dibutyl maleate or the vinyl chloride resins may be delta or gamma polyvinyl chloride. To secure compositions of good physical properties, it is desirable that the vinyl chloride resins be of high molecular weights, as determined by their relative insolubility in certain solvents, such as toluene and butyl acetate. Most of the resins, however, are soluble in cyclic and unsaturated ketones, such as mesityl oxide, isophorone and cyclohexanone. In making the copolymers, vinyl chloride is usually employed in predominant amount. The preferred resins are copolymers of vinyl chloride and vinyl acetate containing 95 to 99% vinyl chloride, and polyvinyl chloride.

To obtain suspensions of adequate fluidity, it is essential to start with finely-divided resins. Mechanical methods of sub-division are, in general, not wholly satisfactory because of the limitation on the particle size of the resins obtainable. It is preferable to employ a vinyl chloride resin which is made by the polymerization of the monomeric materials in aqueous emulsion, according to known procedures, for instance, by polymerization at low temperatures of 35° to 40° as disclosed in United States Patent No. 2,068,424. The resin particles produced by emulsion polymerization are extremely minute, and the agglomerates produced by coagulation of the resinous suspensions formed by polymerization of the monomeric materials in aqueous emulsion retain the ability to be sub-divided.

In forming the suspension, the vinyl chloride resins are intimately mixed with the polyglycol dimethacrylate plasticizer together with a conventional plasticizer in the proportions of 66 to 150 parts of total plasticizer per 100 parts of resin, together with pigments, stabilizers, powdered filling materials and flameproofing ingredients, if desired. Examples of conventional plasticizers for the vinyl chloride resins include di(2-ethylhexyl) phthalate, dicapryl phthalate, tri(2-ethylhexyl) phosphate, butyl phthalyl butyl glycollate, dibutyl and dioctyl sebacate, di(2-ethylhexyl) succinate, tricresyl phosphate, the diester-amide of diethanolamine with 2-ethylhexanoic acid and the like.

It will be seen from the above description that the plastisols of this invention may be highly fluid in the liquid state so that they may fill all the crevices in molds or flow out evenly in coating cloth, metals and the like. However, by adjusting the ratio of the polyethylene glycol dimethacrylate to the conventional ester plasticizer, the stiffness and hardness of the cured elastomer may be controlled to any desired degree up to a semi-rigid elastomer. Thus the present invention greatly increases the versatility of the plastisol type of formulation.

What is claimed is:

1. A plastisol comprising a finely-divided emulsion-polymerized copolymer of vinyl chloride with vinyl acetate containing 95 to 99% vinyl chloride suspended in a dispersant constituting 40 to 60% by weight of the total of the copolymer and dispersant, the dispersant consisting of a mixture of 10 to 40% by weight of diethylene glycol dimethacrylate and 60 to 90% by weight of di-(2-ethylhexyl) phthalate.

2. A plastisol comprising a finely-divided emulsion-polymerized copolymer of vinyl chloride with vinyl acetate containing 95 to 99% vinyl chloride suspended in a dispersant constituting 40 to 60% by weight of the total of the copolymer and dispersant, the dispersant consisting of a mixture of 10 to 80% by weight of a methacrylate diester of a liquid polyethylene glycol and 20 to 90% by weight of a liquid ester plasticizer which does not polymerize on heating.

3. A plastisol comprising a finely-divided emulsion-polymerized copolymer of vinyl chloride with vinyl acetate containing 90 to 99% vinyl chloride suspended in a dispersant constituting 40 to 60% by weight of the total of the copolymer and dispersant, the disperant consisting of a mixture of 10 to 80% by weight of a methacrylate diester of a liquid polyethylene glycol and 20 to 90% by weight of a liquid ester plasticizer which does not polymerize on heating, the amount of said diester incorporated in the dispersant being correlated with its molecular weight so that the cured plastisol has a hardness below 100 on the Shore durometer "A" scale and a flexural modulus of elasticity below 15,000 lbs. per sq. in.

4. A plastisol comprising a finely-divided emulsion polymerized vinyl chloride resin containing at least 95% of polymerized vinyl chloride suspended in a dispersant constituting 40 to 60% by weight of the total of vinyl chloride resin and dispersant; the dispersant consisting of a mixture of 10 to 80% by weight of a methacrylate diester of a liquid polyethylene glycol and 20 to 90% by weight of a liquid ester plasticizer which does not polymerize on heating, and said resin not being solvated by the methacrylate diester at room temperatures.

5. A plastisol comprising a finely-divided, emulsion-polymerized vinyl chloride resin suspended in a dispersant constituting 40 to 60% by weight of the total of vinyl chloride resin and dispersant; the dispersant consisting of a mixture of 10 to 80% by weight of a methacrylate diester of a liquid polyethylene glycol and 20 to 90% by weight of a liquid ester plasticizer which does not polymerize on heating, said resin containing a predominant amount of polymerized vinyl chloride and not being solvated by the methacrylate diester at room temperatures.

6. A plastisol comprising a finely-divided, emulsion-polymerized vinyl chloride resin suspended in a dispersant constituting 40 to 60% by weight of the total of vinyl chloride resin and dispersant; the dispersant consisting of a mixture of 10 to 80% by weight of a methacrylate diester of a liquid polyethylene glycol and 20 to 90% by weight of a liquid ester plasticizer which does not polymerize on heating, the amount of said diester incorporated in the dispersant being correlated with its molecular weight so that the cured plastisol has a hardness below 100 on the Shore durometer "A" scale and a flexural modulus of elasticity below 15,000 lbs. per sq. in., said resin containing a predominant amount of polymerized vinyl chloride and not being solvated by the methacrylate diester at room temperatures.

SAMUEL L. BURT.

REFERENCES CITED

The following references are of record in the file of this patent:

UNITED STATES PATENTS

| Number | Name | Date |
| --- | --- | --- |
| 2,129,722 | Woodhouse | Sept. 13, 1938 |
| 2,155,590 | Garvey | Apr. 25, 1939 |
| 2,386,995 | Wigal | Oct. 16, 1945 |
| 2,447,056 | Cooper | Aug. 17, 1948 |
| 2,468,094 | Marks | Apr. 26, 1949 |

FOREIGN PATENTS

| Number | Country | Date |
| --- | --- | --- |
| 606,936 | Great Britain | Aug. 23, 1948 |

OTHER REFERENCES

Powell, Official Digest, December 1946, pp. 696, 697, 700.